Feb. 6, 1968  S. A. SEYMOUR ETAL  3,367,521
SELF-CLEANING SILO UNLOADER IMPELLER
Filed Aug. 24, 1966  4 Sheets-Sheet 4
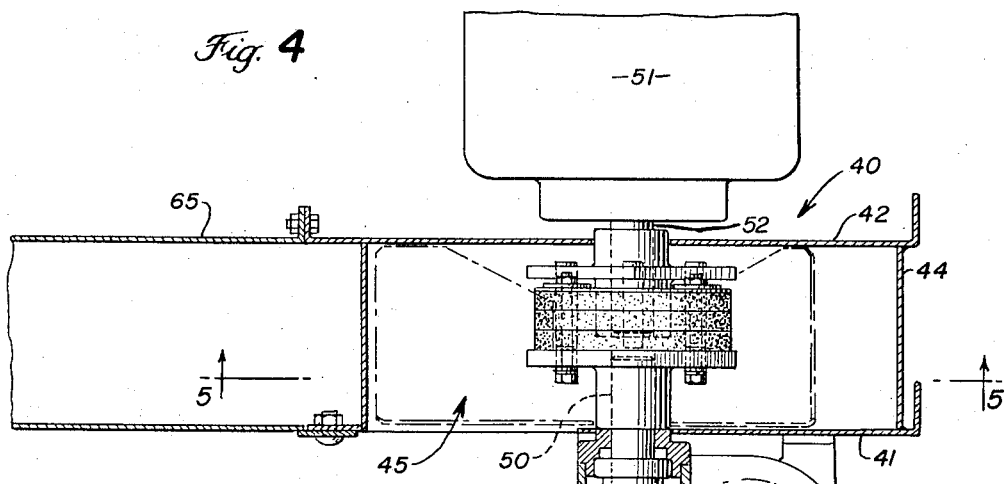
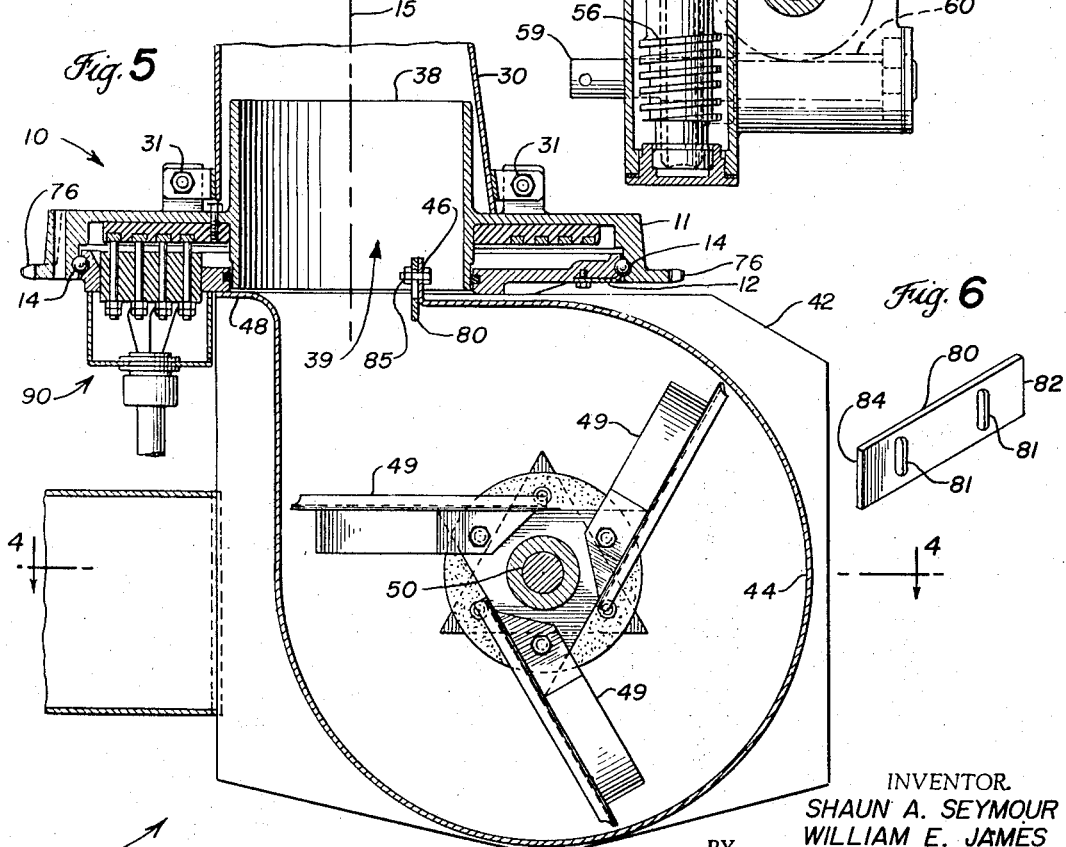
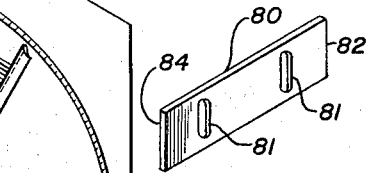
INVENTOR.
SHAUN A. SEYMOUR
WILLIAM E. JAMES
BY Walter V. Wright

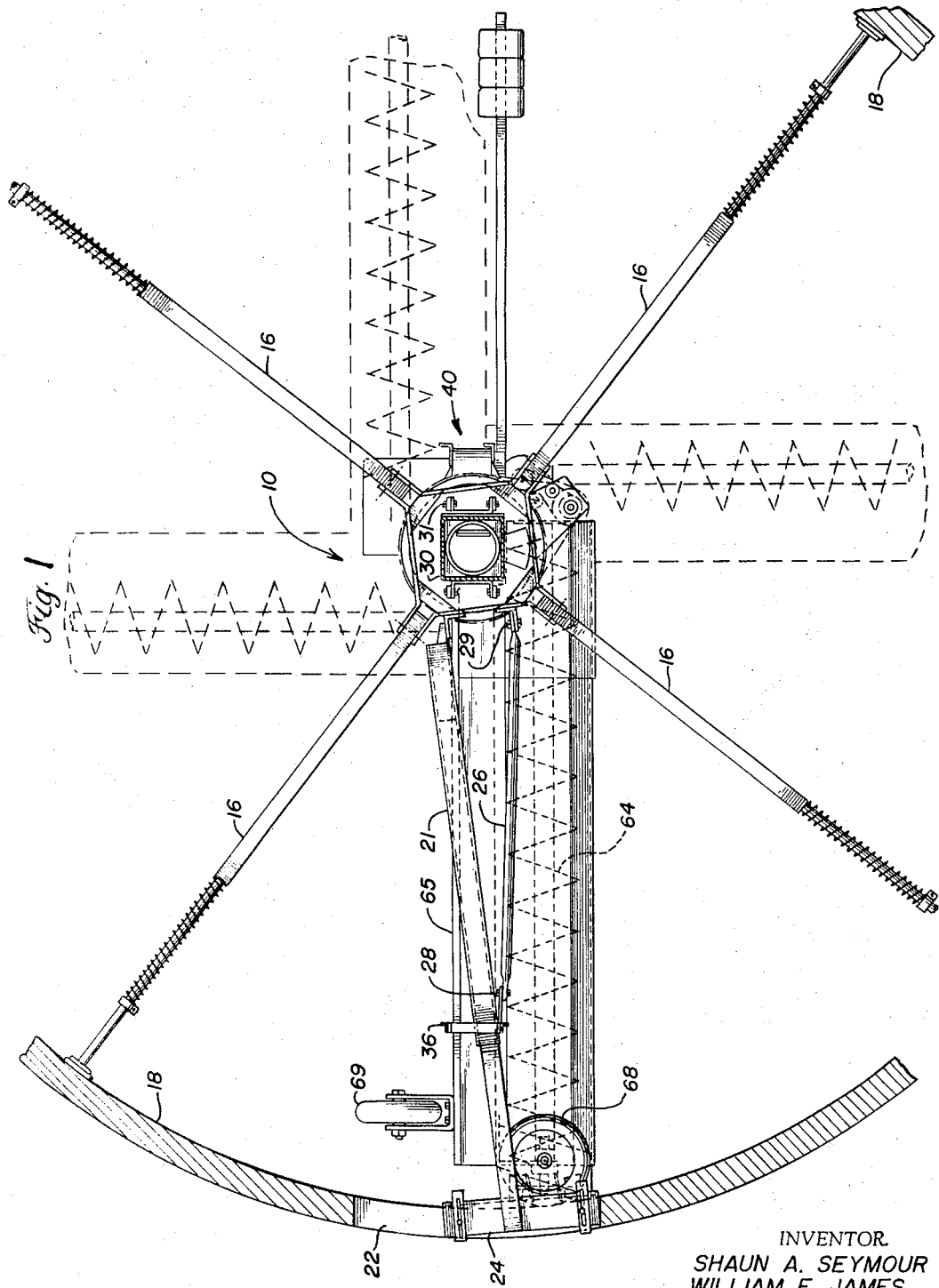

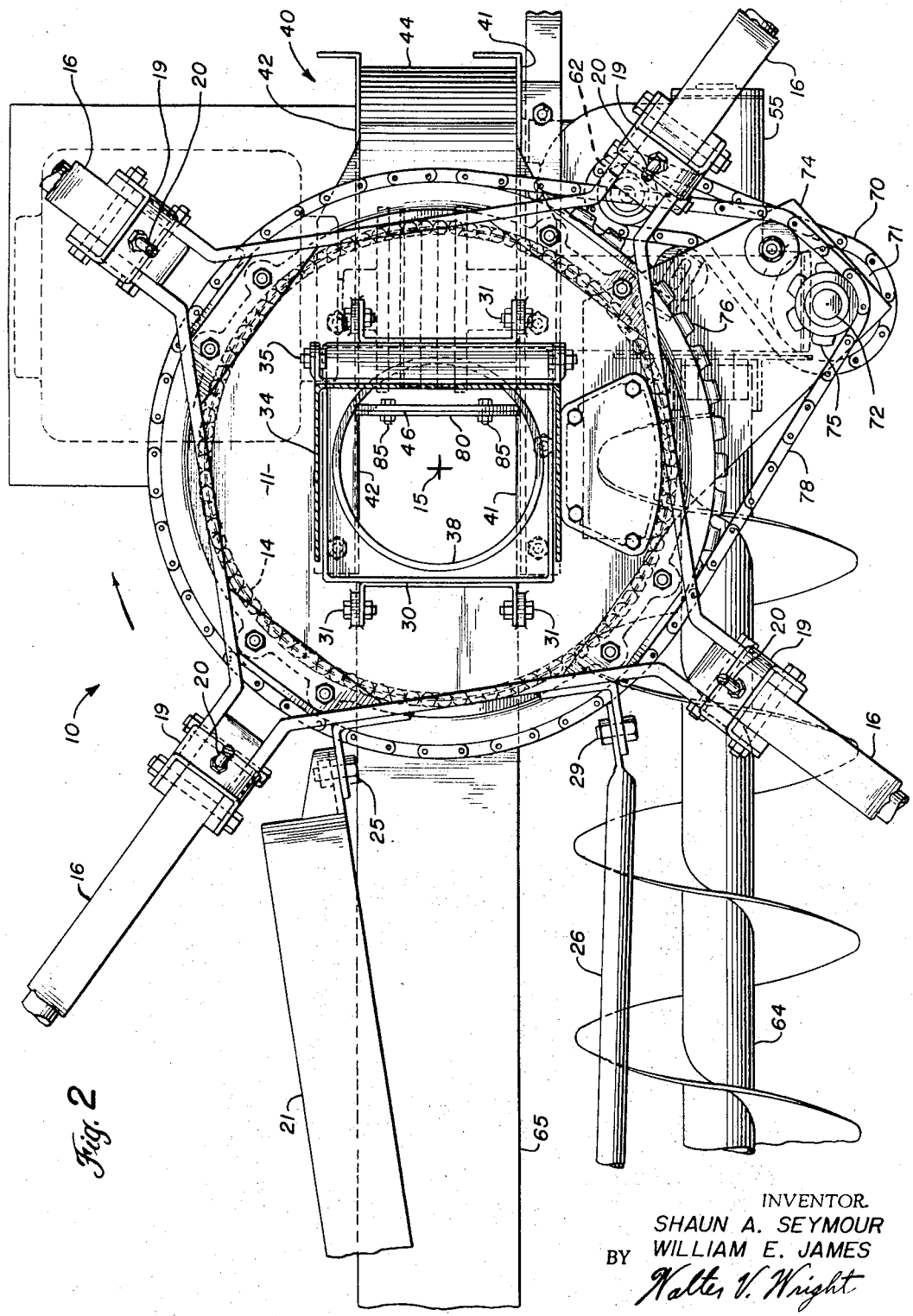

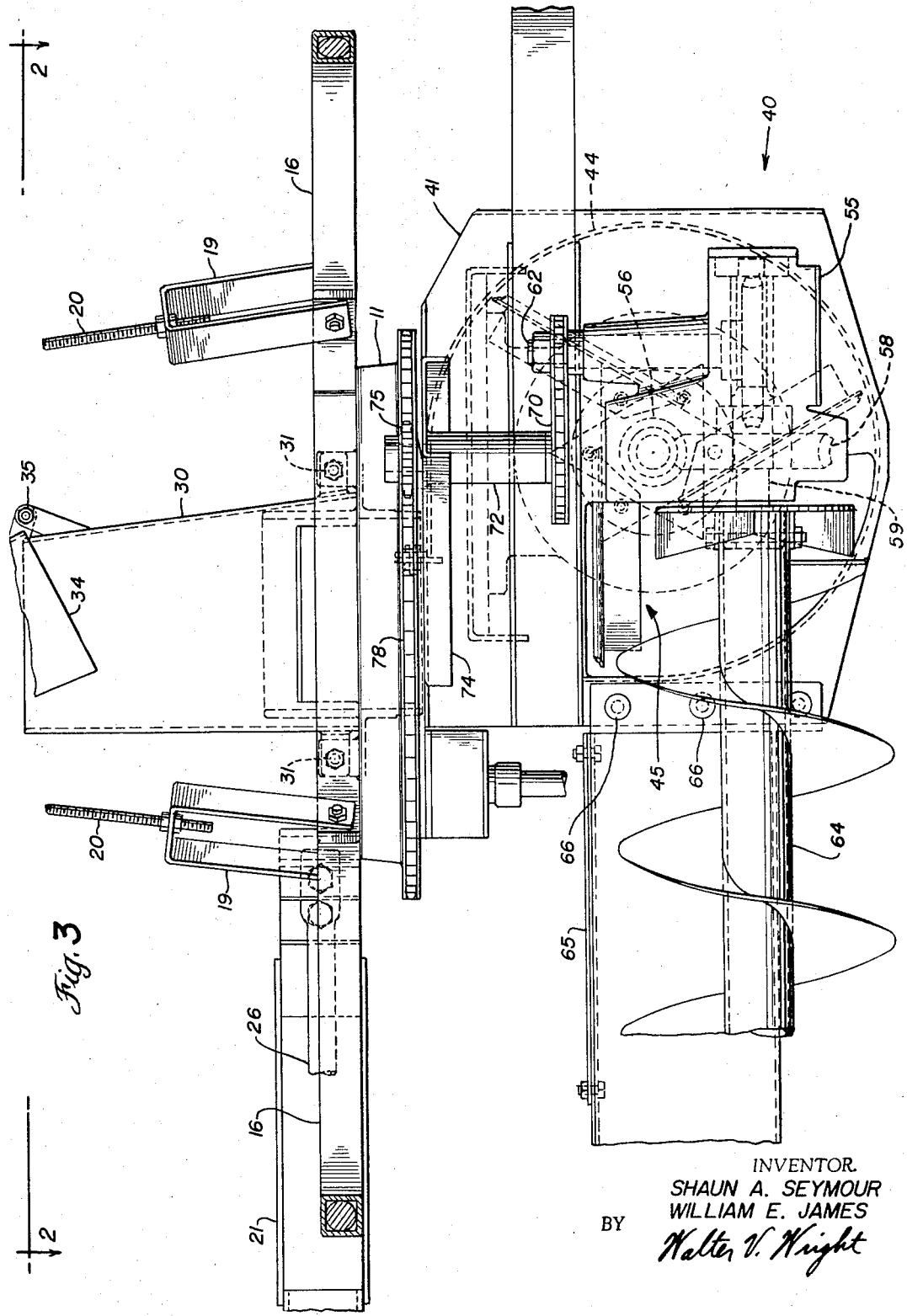

United States Patent Office 3,367,521
Patented Feb. 6, 1968

3,367,521
SELF-CLEANING SILO UNLOADER IMPELLER
Shaun A. Seymour, Ephrata, Pa., and William E. James, Dijon, France, assignors to Sperry Rand Corporation, New Holland, Pa., a corporation of Delaware
Filed Aug. 24, 1966, Ser. No. 574,593
5 Claims. (Cl. 214—17)

This invention relates generally to silo unloaders. More particularly, it relates to silo unloaders of the type intended to operate on the top surface of material in a silo, as opposed to bottom unloaders which are disposed on the silo floor under the column of silage.

Top silo unloaders are usually divisible into two major parts, a rotating portion which moves about the central axis of the silo to gather material from the top surface of the column of silage and convey it into the center of the silo, and a fixed portion including a stationary spout extending upwardly and radially outwardly from the center of the silo toward the vertical column of access doors in the silo wall. Between the rotating gathering means and the fixed discharge spout, the material is fed into an impeller which propels it up the spout and out of the silo through one of the access doors. The impeller may be incorporated into either the fixed portion of the silo unloader or the rotating portion of the unloader. A problem often encountered in silo unloaders is that the sticky silage tends to cling to, and build up on the innerwall of the spout. This reduces the efficiency and capacity of the unloader and can ultimately result in plugging of the machine. The problem is particularly acute at the area where the impeller discharges into the spout. This is often an area of the machine requiring frequent maintenance and cleaning, particularly when certain types of silage are being handled.

It is an object of this invention to provide a silo unloader combination having material discharging mechanism exhibiting sustained maintenance free operation at high capacity and efficiency.

It is another object of this invention to provide a silo unloader combination wherein silage material is positively prevented from building up on the inner wall of the discharge spout adjacent the impeller discharge opening.

It is another object of this invention to provide a silo unloader combination including a mechanically simple, low cost scraper to automatically clean the inner wall of the discharge spout adjacent the silage impeller.

These and other objects and advantages of this invention will be apparent upon reference to the following description and claims taken in conjunction with the accompanying drawings:

FIG. 1 is a plan view of a silo unloader constructed in accordance with the principles of the present invention shown in operative relation to a silo wall. The discharge spout is shown in section, the upper portion thereof being eliminated for clarity.

FIG. 2 is an enlarged fragmentary plan view of the central portion of the silo unloader shown in FIG. 1 and taken as indicated by the line 2—2 of FIG. 3.

FIG. 3 is a side elevational view of the mechanism shown in FIG. 2.

FIG. 4 is a sectional view taken on the line 4—4 of FIG. 5.

FIG. 5 is a vertical sectional view of the impeller and spout in the orientation of FIG. 3 and taken on the line 5—5 of FIG. 4.

FIG. 6 is an isometric detail view of the scraper blade seen in FIGS. 2 and 5.

Referring now to the drawings in detail, in FIG. 1 a large diameter journal is indicated, generally, by the reference numeral 10. In FIG. 5 it may be seen that journal 10 comprises an outer annular part 11 and an inner annular part 12. Parts 11 and 12 constitute the outer and inner races for a series of ball bearings 14 which are visible in phantom lines in FIG. 2 as well as in solid lines in FIG. 5. Thus, the first and second journal parts 11 and 12 are interconnected for rotation relative to each other about a central axis 15 shown in FIGS. 2 and 5. In FIGS. 1, 2, and 3 it may be seen that a series of four spring loaded centering arms 16 are fixedly carried by first journal part 11 and engageable with the circular wall 18 of a silo at angularly spaced points to substantially center journal means 10 and its axis of rotation in the silo. In FIGS. 2 and 3 it may be seen that a plurality of suspension cable brackets 19 are also attached to first journal part 11 at the mounting points of the centering arms 16. Cables 20 (FIGS. 2 and 3) are attached to the brackets 19 and extend upwardly to the top of the silo to support the entire silo unloader in suspension just above the top surface of the silage material, as is well known in the silo unloader art. The usual torque arm 21 extends generally radially outwardly from first journal part 11 and has its outer end clamped on the sill 22 of one of the vertical columns of access openings conventionally provided in silos. In FIG. 1, the usual adjustable saddle-type bracket 24 is shown connecting the torque arm 21 to the sill of access opening 22. The purpose of torque arms 21 is, as is well known in the art, to prevent a certain portion of the silo unloader mechanism from rotating about the axis of rotation of the journal means 10. In the present instance, the torque arm 21 is bolted directly to the centering and suspension members fixed to first journal part 11 as may be seen in FIG. 2 at 25. The torsional rigidity of arm 21 is supplemented by a diagonal brace 26 which is bolted between torque are 21 and the centering and suspension frame members as indicated at 28 and 29 in FIG. 1. Torque arm 21 prevents first journal part 11 from rotating about it own axis 15.

In FIGS. 1, 2, 3, and 5 the base section 30 of the usual discharge spout is shown bolted at 31 to brackets fixedly carried by the top surface of first journal part 11. In FIG. 3, the lower end 34 of the arcuate portion of the discharge spout is shown pivotally mounted at 35 to the spout base 30. As is well known in the art, the arcuate spout portion 34 extends upwardly and outwardly and has its outer end directed at the previously mentioned access door 22. In FIG. 1, a support bracket 36 may be seen fixedly carried by torque arm 21. The discharge spout 34 continues upwardly and outwardly from base 30 and has its outer end supported by the bracket 36 on torque arm 21.

Referring again to FIG. 5, it may be seen that an annular wall 38 is integrally formed with first journal part 11 and extends upwardly therefrom inside of spout base portion 30. The annular wall 38 also extends downwardly to the lower level of second journal part 12 and defines an annular passage 39 through the journal means coaxial with the axis of rotation 15.

All the above elements except second journal part 12 are held stationary relative to the axis of rotation 15 by engagement of the outer end of torque arm 21 with the wall of the silo. The second journal member 12 is free to rotate about axis 15 relative to first journal member 11 on the ball bearings 14.

An impeller chamber generally indicated by the reference numeral 40 is shown in section in FIG. 5. Impeller chamber 40 has vertical planar side walls 41 and 42 fixedly attached by welding or the like to the underside of second journal part 12. An annular housing wall 44 extends perpendicularly between the planar side walls 41 and 42. In FIGS. 3 and 4, a material inlet opening 45 is shown in side wall 41. In FIGS. 2 and 5, it will be seen that annular housing wall 44 terminates at one end in an upturned flange 46 which projects upwardly within the annular wall 38 carried by first journal part 11. The other terminal end of annular wall 44 is disposed as shown at 48 in FIG. 5 just below the lower edge of annular wall 38. The flange 46 and the other terminal end 48 of annular wall 44 combine with impeller housing side plates 41 and 42 to define an upwardly directed discharge opening from impeller chamber 40 which has a substantially rectangular shape and communicates directly with the passage 39 defined by annular wall 38.

A three bladed impeller 49 is disposed within impeller chamber 40 and has a central horizontal shaft 50 which may be seen in section in FIG. 5. In FIG. 4 it may be seen that a motor 51 is disposed outside of impeller chamber 40 and has its shaft 52 coupled directly to the shaft 50 of impeller blades 49. Shaft 50 extends on through the impeller housing and constitutes the input shaft 54 of a gearbox 55 mounted on the outer side of impeller chamber side plate 41. The gearbox input shaft 54 has formed thereon a worm 56 which drives a worm wheel 58 fixed to a first output shaft 59 of gearbox 55. A second worm diagrammatically indicated at 60 in FIG. 4 is provided on first output shaft 59 and drives a second worm wheel 61 which is fixed to a second vertically extending output shaft 62 of the gearbox 55.

Referring now to FIGS. 2 and 3, along with FIG. 4, it may be seen that first output shaft 59 is coupled directly to the usual gathering auger 64 which extends radially outwardly from the center portion of the silo unloader mechanism as may be seen in FIG. 1. The radially outer end of auger 64 adjacent the silo wall is journalled in a conventional manner not shown, in a frame arm 65 which is bolted to and extends radially outwardly from impeller housing 40 as may be seen at 66 in FIG. 3. In FIG. 1 it will be also apparent that the usual thrust reaction wheel 68 and support wheel 69 are carried by frame arm 65 at the radially outer end thereof.

Second gearbox output shaft 62 serves to drive the second journal member 12, the impeller chamber 34 and all the subsequently described silo unloader components in rotation about axis 15 relative to first journal part 11. In FIGS. 2 and 3, one particularly successful rotational driving arrangement is illustrated. A short endless chain 70 is intrained about a driving sprocket fixed to the upper end of gearbox output shaft 62. The endless chain 70 drives a sprocket 71 (FIG. 2) keyed to the lower end of a vertical jack shaft 72 which is journalled in a horizontal mounting plate 74 which is fixedly attached to impeller housing 40. A small sprocket 75 is fixedly carried by jack shaft 72 at the upper end thereof. The small sprocket 75 lies in the same horizontal plane as the sprocket teeth 76 formed about the outer perimeter of first journal member 11 (see FIG. 5). An endless chain 78 is entrained about the sprocket teeth 76 and the small diameter sprocket 75 on jack shaft 72. Since the first journal part 11 is prevented from rotating by torque arm 21, when sprocket 75 is rotated from its driven connection with gearbox output shaft 62, the sprocket 75 creeps about chain 58 propelling second journal part 12 and all the elements fixed thereto in rotation about the central axis 15.

In FIGS. 5 and 6 an elongated rectangular scraper blade, or plate, 80 may be seen. Plate 80 is also clearly visible in FIG. 2. A pair of elongated slots 81 are formed in scraper plate 80 with the direction of elongation extending parallel to the short ends 82 and 84 of the plate. Scraper plate 80 extends between the side plates 41 and 42 of impeller housing 40 and is attached to the upturned flange 46 of annular wall 44 by a pair of bolts 85. In FIG. 2 it will be apparent that scraper plate 80 extends across the annular passage 39 defined by circular wall 38 and lies to one side of the central axis 15. The scraper plate 80 forms a chord across annular passage 39 with the short ends 82 and 84 of the plate bearing against annular wall 38.

A series of electrical rings and brushes 90 are generally indicated in FIG. 5. Such elements are commonly provided in silo unloaders to supply motor operating current to the drive motor 51 from a source of electrical energy on the ground. The details of this electrical mechanism as well, in fact, as the specific supporting and centering means, drive means, and gathering means are not really essential to the specific invention disclosed herein. The present invention resides in the combination of elements including and coacting with scraper blade 80 which prevents sticky silage material from accumulating precisely at the point where the impeller discharges material into the spout. It will be apparent from FIGS. 2 and 5 that as the second journal part 12 and impeller housing 40, along with the gathering auger 64, rotates about the axis 15 the ends 82 and 84 of scraper plate 80 will continuously clean the lower inner surface of annular wall 38 thereby preventing the buildup and bridging of material across the spout passage in this critical area.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. In a silo unloader, the combination comprising journal means having first and second annular parts interconnected for rotation relative to each other about a central axis, means for substantially centering said journal means in a silo with said axis of rotation extending generally vertically, an annular wall extending through both said journal parts and defining a passage therethrough coaxial with said axis of rotation, said annular wall being fixed to one of said journal parts for rotation therewith relative to said other journal part, an impeller chamber fixedly mounted on said other of said journal parts and having a discharge opening coaxial with said axis of rotation and communicating with said passage, means operatively associated with said impeller chamber to gather and deliver silage into said chamber, impeller means in said chamber to propel silage delivered thereto through said discharge opening and said passage, drive means operatively associated with said journal means to effect relative rotation of said journal parts about said axis of rotation, and a scraper member fixedly mounted on said impeller chamber at said discharge opening and extending into said passage, said scraper member having an end engaging said annular wall and movable along the surface thereof upon rotation of said other journal part relative to said one journal part thereby preventing the buildup of material on said annular wall adjacent the discharge opening of said chamber.

2. The combination recited in claim 1 wherein said scraper comprises an elongated rectangular plate whose longest dimension is less than the diameter of said passage defined by said annular wall, the portion of said scraper plate in said passage extending thereacross in the form of a chord and having both ends bearing on said annular wall.

3. The combination recited in claim 2 wherein said impeller chamber has parallel vertical planar side plates interconnected by an arcuate housing wall, said discharge opening having a generally rectangular perimeter, two opposing sides of said perimeter being defined by the ends of said arcuate wall, the remaining two opposing sides of said perimeter being defined by said planar side plates, said scraper plate extending perpendicularly between said side plates.

4. The combination recited in claim 1 wherein said impeller chamber has an outturned flange thereon at said discharge opening and projecting into said passage, said scraper member abutting said flange, and bolt means interconnecting said scraper member and said flange within said passage and exteriorly of said impeller chamber.

5. The combination recited in claim 4 wherein said scraper member has formed therein a plurality of elongated slots, said slots being elongated along a line parallel to said axis of rotation, said bolt means connecting said scraper and said flange extending through said slots to afford adjustment of the extension of said scraper into said passage.

References Cited
UNITED STATES PATENTS

| | | | |
|---|---|---|---|
| 2,794,560 | 6/1957 | Buschbom | 214—17 |
| 2,877,907 | 3/1959 | Buschbom | 214—17 |

ROBERT G. SHERIDAN, *Primary Examiner.*